United States Patent

Kawaguchi

[11] Patent Number: 5,833,914
[45] Date of Patent: Nov. 10, 1998

[54] APPARATUS AND METHOD OF LAMINATE MOLDING USING RELEASER

[75] Inventor: Noboru Kawaguchi, Aichi, Japan

[73] Assignee: K-Net Systems, Inc., Komaki, Japan

[21] Appl. No.: 507,234

[22] PCT Filed: Dec. 22, 1994

[86] PCT No.: PCT/JP94/02205

§ 371 Date: Aug. 24, 1995

§ 102(e) Date: Aug. 24, 1995

[87] PCT Pub. No.: WO95/18010

PCT Pub. Date: Jul. 6, 1995

[30] Foreign Application Priority Data

Dec. 24, 1993 [JP] Japan .................................. 5/347882

[51] Int. Cl.$^6$ ............................ B29C 33/40; B32B 31/00
[52] U.S. Cl. ..................... 264/400; 264/40.1; 264/130; 264/163; 264/219; 264/246; 264/308; 264/317; 264/401; 264/496; 264/221; 164/98; 164/456; 156/257; 156/264; 156/275.5; 156/353; 425/87; 425/90; 425/176; 425/375
[58] Field of Search ................................ 264/308, 246, 264/401, 400, 40.1, 496, 219, 317, 130, 163, 221; 425/87, 90, 150, 175, 176, 375; 156/275.5, 353, 257, 264, 517, 522; 164/98, 456, 100

[56] References Cited

U.S. PATENT DOCUMENTS

| | | | |
|---|---|---|---|
| 5,121,329 | 6/1992 | Crump | 264/308 |
| 5,141,680 | 8/1992 | Almquist et al. | 264/308 |
| 5,260,009 | 11/1993 | Penn | 264/308 |
| 5,286,573 | 2/1994 | Prinz et al. | 264/308 |
| 5,301,415 | 4/1994 | Prinz et al. | 264/308 |
| 5,340,433 | 8/1994 | Crump | 264/401 |
| 5,358,673 | 10/1994 | Heller et al. | 264/401 |
| 5,362,427 | 11/1994 | Mitchell, Jr. | 264/308 |
| 5,402,351 | 3/1995 | Batchelder et al. | 264/401 |
| 5,501,824 | 3/1996 | Almquist et al. | 264/308 |
| 5,503,785 | 4/1996 | Crump et al. | 264/308 |
| 5,506,607 | 4/1996 | Sanders, Jr. et al. | 425/375 |

FOREIGN PATENT DOCUMENTS

| | | |
|---|---|---|
| 0426363 | 5/1991 | European Pat. Off. . |
| 0484086A1 | 5/1992 | European Pat. Off. . |
| 0633129A1 | 1/1995 | European Pat. Off. . |
| 63-72526 | 4/1988 | Japan . |
| 2-55638 | 2/1990 | Japan . |
| 2-78531 | 3/1990 | Japan . |
| 6-55642 | 3/1994 | Japan . |
| 7-68647 | 3/1995 | Japan . |
| 90/03893 | 4/1990 | WIPO . |
| 94/09971 | 5/1994 | WIPO . |
| 95/18009 | 7/1995 | WIPO . |

*Primary Examiner*—Jan H. Silbaugh
*Assistant Examiner*—Mark Eashoo
*Attorney, Agent, or Firm*—Morgan, Lewis & Bockius LLP

[57] ABSTRACT

A laminate molding method of fabricating a desired shape consisting of laminate layers having a first type layer in a completely solidified state, the method includes a first step of forming a second type layer on the first type layer, the first type layer having a viscosity larger than the second type layer, a second step of forming a slot groove in the second layer, the second type layer having first and second regions, a third step of printing a releaser on a predetermined region of the second type layer, a fourth step of forming a third type layer on the second type layer or on the first type layer, the second type having a viscosity larger than the third type layer, a fifth step of solidifying the third type layer to form the first type layer, and a sixth step of repeating the first, second, third, fourth, and fifth steps as desired.

30 Claims, 10 Drawing Sheets

APPARATUS AND METHOD OF LAMINATE MOLDING USING RELEASER

TECHNICAL FIELD

The present invention relates to a method for molding a laminate having a desired shape by laminating solidifying layers, and an apparatus used for the method, and particularly, to a laminate molding method and a laminate molding apparatus in which a releaser is printed by a press.

BACKGROUND ART

Conventionally, in development of new products, the fabrication of trial productions has been widely carried out. For example, in the automobile industry, in designing new model vehicles, first, a scale-down three-dimensional model is produced by way of trial, and design is studied, after which a three-dimensional model is again produced by way of trial to gradually determine the design of detailed portions. In this case, if a model is a three-dimensional model of a simple shape, preparation of a Numerical Control (NC) tape, management of knife edges and the like are necessary but the three-dimensional model can be comparatively easily formed using mechanical cutting means or the like. However, if a model is a three-dimensional model having a complicated shape, there exist problems in that it takes time for the molding by the mechanical cutting means and it is difficult to shape the detailed portions.

In view of the foregoing, a laminate molding method has been put to practical use as a method which, even in molding a simple three-dimensional model, requires no preparation of an NC tape, easy in the management of knife edges, and can shape even a three-dimensional model having a complicated shape in a short period of time. Such methods include, for example, a method for forming a mask pattern on a mask plate by an electrostatic toner, on the basis of data inputted into a computer in advance, placing the mask pattern on a resin layer coated with a photo-hardening resin to irradiate an ultraviolet light thereon, sufficiently exposing it, thereafter attracting an unhardened resin layer, filling with wax a clearance formed by removing the photo-hardening resin, thereafter cooling the wax, and repeatedly cutting the hardened resin layer and the wax to obtain a desirably-shaped three-dimensional model, and a method for forming a hardened layer by a photo-hardening resin and a solidifying material.

In such a laminate molding method as described above, the photo-hardening resin is widely used as a molding material. Other methods include a method for obtaining a three-dimensional model having a desired shape by superposing a plurality of layers each formed from ordinary paper or the like while putting cuts therein, and a method of obtaining a three-dimensional model by pressing a powder of a solidifying material into a hard lump to form a thin powder layer, applying a laser irradiation light thereto to thereby repeat sintering the portion to be irradiated to laminate the hardened layers, these methods being put to practical used.

According to these laminate molding methods, an inverted-warp model or the like can be easily formed, which has been heretofore difficult by mechanical cutting means or the like. Further, a model provided with a precise construction can be formed.

However, in the method for forming a mask pattern, hardening a desired photo-hardening resin by an ultraviolet light having transmitted through the mask pattern, and filling with wax to obtain a three-dimensional model, there existed a problem in that the step of attracting a surplus photo-hardening resin is necessary, as a result of which noises resulting from the attraction are generated, and when the surplus photo-hardening resin is attracted, resins of finely shaped portions are absorbed or the surplus resins remained in the fine portions, failing to obtain a model having a high precision, particularly a model whose contour portion is high in precision.

Further, in this method, the cutting is carried out in order that after the wax has been filled, the layers comprising the photo-hardening resin and the wax are arranged into a predetermined thickness in preparation for coating of a successive layer. However, there exists a problem in that when the surface of the photo-hardening resin once hardened is cut, the surface activity of the photo-hardening resin lowers, and even if an unhardened photo-hardening resin is coated thereon, the adhesive performance of upper and lower layers becomes worsened. There is a further problem in that energy consumption as the whole apparatus is large.

Furthermore, in the method for forming a thin powder layer and irradiating a laser beam thereon to sinter the powder layer into a desired shape, it is necessary to irradiate the laser beam over the wide range to sinter the powder, but there exists a problem in that the depthwise sintering characteristic is not stabilized, making it difficult to obtain a firmly bonded model. This generally results from the fact that proper control of irradiation output of the laser beam is difficult, and control of irradiation output of the laser beam in a very narrow range is demanded in order to sinter only the thin powder layer as intended.

Moreover, in the method for coating and solidifying a solidifying material, after which a part thereof is shaved off by irradiating a laser beam, and filling it with a photo-hardening resin which functions as a releaser, there occurs a problem in that filling of the photo-hardening resin in only the necessary portion is not realized, and therefore, it is necessary to shave off many portions to fill the many portions with the photo-hardening resin, resulting in a poor working efficiency and a high cost.

Further, there was a problem in that these laminate molding apparatuses need be applied with a temperature management, dust measures and the like, and the installation site is limited because of generation of vibrations and noises.

The present invention has been accomplished in order to solve the aforementioned problems. An object of the invention is to provide a laminate molding method and apparatus capable of coating a releaser on only necessary portions of a solidifying layer and capable of easily controlling an irradiation output of a laser beam. Another object of the invention is to provide a laminate molding method and apparatus of enhancing a working efficiency and capable of obtaining a laminate model which is higher in molding precision.

DISCLOSURE OF THE INVENTION

For achieving the aforementioned objects, the present invention provides a laminate molding method for laminating hardening layers composed of a solidifying material and a releaser to thereby obtain a laminate having a desired shape, the method includes: a first step of forming a slot groove in a solidifying layer constituting a surface of the laminated hardening layer to divide the solidifying layer into a necessary region constituting the laminate having a desired shape and an unnecessary region not constituting the laminate having a desired shape, a second step of printing a releaser on a predetermined region of a solidifying layer constituting the surface of said hardening layer or a predetermined region of a solidifying material sheet constituting a new solidifying layer, a third step of forming a new non-solidified state solidifying material layer on said solidifying layer on which the releaser is printed or on said hardening layer, and a fourth step of solidifying the solidifying material layer to form a new hardening layer.

In the third step, it is preferable that a non-solidified solidifying material is applied in a predetermined thickness to the surface of the solidifying layer on which the releaser is printed to form a semi-solidified solidifying material layer. In this case, the releasing agent used in the second step is preferably a photo-hardening resin material, and the solidifying material used in the third step is preferably a solidifying material in which a polyvinyl alcohol and a co-compound are added to urea. Further, in the third step, a solidifying sheet may be placed on the solidifying layer on which a releaser is printed to melt the solidifying sheet, thereby forming a non-solidified solidifying material layer, and a solidifying material sheet on which a releaser is printed may be cut out into a predetermined size, and the thus cut-out solidifying material sheet may be molten to thereby form a non-solidified solidifying material layer. Further, preferably, the releaser used in the second step is a slurry-like ceramic having a high heat resistance, and the solidifying material used in the third step is metal to be flame-sprayed from a metal flame-spraying apparatus.

In this case, as the solidifying material sheet, there can be used a coated paper in which a solidifying material is applied to paper which is a fibrous sheet. The thickness of the coated paper is 0.1 to 0.2 mm, and the coating thickness of the solidifying material may be 20 to 50 $\mu$m or so. In case of using one in which a solidifying material is applied to the paper, this is allowed to pass through a heat roller or the like in advance, whereby the solidifying material on the coated paper is molten, in which it is placed on the solidifying layer on which the releaser is printed to solidify it so as to form a new hardening layer. By doing so, there is produced the merit in that the production efficiency is enhanced and the productivity is improved as compared with the method in which even if the solidifying material sheet is placed on the solidifying layer on which the releaser is printed and then heated and molten, after which it is solidified.

Further, in the third step, if the releaser printed on the solidifying layer is not solidified, when the solidifying material sheet is placed thereon, the releaser is sometimes spread laterally between the solidifying material sheet and the solidifying layer. In case of using one in which a solidifying material is applied to the coated paper, since the coated paper itself is fibrous, the releaser may permeate the coated paper but is not spread laterally. Accordingly, in the step in which the step returns to the first step later in which a slot groove is formed in the solidifying layer on the basis of a section vector data in which a three-dimensional model is sent to form a contour, one which is high in adhesive strength of the contour portion and small in shape is finished. Moreover, in that case, even if the released printed on the solidifying layer in the third step is not hardened, one in which the solidifying material is applied to the coated paper can be heated and molten and then superposed (placed), and therefore, the productivity can be further enhanced.

Furthermore, the provision of a coated paper which is cheaper than a 100% solidifying material sheet as a constituent element of a laminate shaped article can provide more inexpensive shaped article, producing the economical advantage.

The second step in the above-described laminate molding method is preferably the step in which a releaser is printed on a solidifying layer corresponding to a necessary region, an unnecessary region and an exclusive logic sum region of a slot groove formed in each of upper and lower hardening layers. The fourth step is preferably the step in which a non-solidified solidifying layer is pressed against a temperature-regulating plate through a film having a releasing property to thereby form a hardening layer. Further, the first step is preferable to irradiate a laser beam to form a cut, and in this case, preferably, a slot is formed at a predetermined angle of inclination within a vertical plane with respect to the slot forming direction. Further, in the first step, plural colors of releasers can be used so that colors as desired can be emitted in the regions as desired.

If the slurry-like ceramic is used as the releaser, and the metal flame sprayed from the metal flame spraying device is used as the solidifying material, as the fourth step, even if the temperature regulating plate is not subjected to the plane molding, the solidifying material is solidified at the time of coating in the subsequent third step merely by cooling it by a blower.

Further, in the third step in which the solidifying material layer is formed on the solidifying layer on which the releaser is printed, if one in which a solidifying material is applied to paper is used, since the coated paper itself has heat retaining properties, the operations of the first, second and third steps are repeated several times in order, after which as the fourth step, natural air cooling is effected to terminate the operation, and then, a heater is turned off and cooling is effected by only the blower. Furthermore, in this case, if the heat retaining properties of the coated paper disposed in the laminate is taken into consideration, the warp caused by the lamination can be relieved or avoided even if the plane molding at the time of cooling used the aforementioned temperature regulating plate is not carried out.

Further, the present invention provides a laminate molding apparatus for laminating hardening layers composed of a solidifying material and a releaser to thereby shape a laminate having a desired shape, the apparatus comprising: slot forming means for forming a slot groove in a solidifying layer constituting a surface of the laminated hardening layer to divide the solidifying layer into a necessary region constituting the laminate having a desired shape and an unnecessary region not constituting the laminate having a desired shape; releaser print means for printing a releaser on a predetermined region of a solidifying layer constituting the surface of the hardening layer or a predetermined region of a solidifying material sheet constituting a new solidifying layer; solidifying material layer forming means for forming a new non-coagulated solidifying material layer on the solidifying layer on which the releaser is printed or on the hardening layer; and solidifying material layer solidifying means for solidifying the solidifying material layer to form a new hardening layer.

The solidifying material layer forming means forms a non-solidified solidifying material layer by applying a non-solidified solidifying material onto the surface of the laminate on which a plurality of hardening layers are laminated and formed to a predetermined thickness and is preferably a spray applicator for spraying a non-solidified solidifying material on the surface of the laminate on which a plurality of hardening layers are laminated and formed to a predetermined thickness or a gravure coater capable of coating a thin film having a high precision. The solidifying material layer forming means may be constituted of solidifying material sheet placing means for placing a solidifying material sheet on the solidifying layer on which a releaser is printed, and solidifying material layer melting means for melting the solidifying material sheet to form a non-solidified solidifying material layer, or may be constituted of solidifying material sheet placing means for placing the solidifying material sheet on which a releaser is printed on the hardening layer, solidifying material sheet cut-out means for cutting out the solidifying material sheet into a predetermined size, and solidifying material layer melting means for melting the solidifying material sheet to thereby form a non-solidified solidifying material layer.

In the aforementioned laminate molding apparatus, the slot forming means is preferably a laser beam irradiation machine and a mechanical cutter, and the releaser printing means is preferably an ink jet type printer or an electrostatic transfer type printer.

As the aforementioned releaser printing means, when a pen plotter is used, a tool change between a pen and a cutter can be easily made, in relation to the case where a cutter plotter is used as the slot forming means, thus providing the convenience that an XY direction positioner can be commonly used. Further, if a laser irradiation device is used as the slot forming means, a tool change between a laser irradiation head and a pen can be made. By doing so, such a convenience is produced that a control device for the XY direction positioner can be commonly used between a pen and a laser.

The laminate molding method according to the present invention having the above-described construction is the method for laminating hardening layers composed of a solidifying material and a releaser to thereby obtain a desirably shaped laminate. The first step is provided so that a slot groove is formed in a solidifying layer constituting the surface of a laminated hardening layer, and the solidifying layer is divided by the slot groove into a necessary region constituting a desirably shaped laminate and an unnecessary region not constituting a desirably shaped laminate to secure releasability with respect to a necessary region of successive layer formed in the subsequent step, an unnecessary region of an already formed layer and a slot groove. The releasability with respect to a necessary region, an unnecessary region and a slot groove can be secured to easily obtain a laminate having a desired shape. The slot groove can be easily formed when it is formed using a laser beam. Further, if a slot groove is formed at a predetermined angle of inclination within a vertical plane with respect to the slot forming direction, a desirably shaped portion of a laminate finally obtained can be easily separated from a surplus portion.

Subsequently, in the second step, a releaser is printed on a predetermined region of a solidifying layer constituting a surface of a hardening layer or on a predetermined region of a solidifying material sheet constituting a new solidifying layer. This releaser is printed on a solidifying layer corresponding to an exclusive logic sum region between a necessary region, an unnecessary region and a slot groove formed on a hardening layer formed this time, and a necessary region, an unnecessary region and a slot groove formed on a hardening layer formed next time. That is, the second step is provided so that the releaser is printed from the slot groove formed previously to the slot groove formed next time to prevent the slot groove from being blocked by the solidifying material, a desirably shaped portion of a laminate finally obtained is easily separated from a surplus portion. At this time, if plural colors of releasers are used, desired colors can be emitted in desired regions to improve the discrimination.

Further, in the third step, a new non-solidified solidifying material layer is formed on a solidifying layer having a releaser printed thereon or on a hardening layer. The third step is carried out so that a non-solidified solidifying material is applied to the surface of a solidifying layer having a releaser printed thereon to a predetermined thickness. If the solidifying material used herein is one in which polyvinyl alcohol and a co-compound are added to urea, releasability from the releaser formed of a photo-hardening resin material previously printed is excellent.

Further, in the third step, a solidifying material sheet is placed on a solidifying layer having a releaser printed thereon, and the solidifying material sheet is molten to form a solidifying material layer in a non-solidified state. Further, a solidifying material sheet having a releaser printed thereon is cut out into a predetermined size, and the cut-out solidifying material sheet is molten to form a solidifying material layer in a non-solidified state. By doing so, the solidifying material can be easily handled.

When the solidifying material layer in the non-solidified state is formed, the fourth step is carried out for solidifying the solidifying material layer to form a new hardening layer including a releaser. The fourth step is carried out by pressing the solidifying layer in the non-solidified state against the temperature regulating plate through a film which is high in releasability. The film having a high releasability is interposed between the solidifying material layer and a flat plate, and the solidifying material layer is pressed against the flat plate. Therefore, it is possible to easily form a solidifying layer having a uniform thickness, and obtain an excellent peelability.

The first to fourth steps are repeated, whereby many hardening layers are superposed and laminated to obtain a laminate having a desired shape.

The laminate molding apparatus provided with the above-described construction according to the present invention is the apparatus for laminating a plurality of hardening layers composed of a solidifying material and a releaser, to thereby shape a laminate having a desired shape. A slot groove is formed in a solidifying layer constituting a surface of a hardening layer by slot forming means, and the solidifying layer is divided by the slot groove into a necessary region constituting a desirably shaped laminate and an unnecessary region not constituting a desirably shaped laminate.

The slot forming means is controlled on the basis of laminate section data of a laminate having a desired shape, and a contour having a laminate section is formed by the slot groove. If a laser beam irradiation machine is used as the slot forming means, the slot groove can be easily formed. If a mechanical cutter is used, a slot depth having a high precision can be formed, and a slot width can be narrowed.

The releaser printing means is provided to print a releaser on a predetermined region of a solidifying layer constituting a surface of a hardening layer or a predetermined region of a solidifying material sheet forming a new solidifying layer. The releaser printed by the releaser printing means is printed on a solidifying layer corresponding to an exclusive logic sum region between a necessary region, an unnecessary region and a slot groove formed on a hardening layer formed this time, and a necessary region, an unnecessary region and a slot groove formed on a hardening layer formed next time.

That is, in superposing the laminate sections, the slot groove is filled up, a desirably shaped portion and a surplus portion of a laminate cannot be separated. But according to this configuration, the separation therebetween can be easily made avoiding the aforementioned state. Preferable releaser printing means used herein include an ink jet type printer or an electrostatic transfer type printer. By using these printers, a releaser can be printed accurately on only the predetermined region.

The solidifying material layer forming means is provided to form a new solidifying material layer in a non-solidified state on a solidifying layer having a releaser printed thereon or on a hardening layer. A solidifying material layer is formed by coating a non-solidified solidifying material on the surface of a laminate or by spraying a non-solidified solidifying material to a predetermined thickness using a spray applicator. Alternatively, it is possible that a solidifying material sheet is placed on a solidifying layer having a releaser printed thereon by solidifying material placing means, the solidifying material sheet is molten by solidifying material layer melting means to form a solidifying material layer in a non-solidified state. It is also possible that a solidifying material sheet is placed on a solidifying layer having a releaser printed thereon by solidifying material placing means, the solidifying material sheet is molten by coagulating material layer melting means to form a coagulating agent material in a non-coagulated state. It is also possible that a coagulating material sheet is placed on a coagulating layer having a releaser printed thereon by coagulating material placing means, the coagulating material sheet is cut out into a predetermined size by solidifying material sheet cut-out means, and the solidifying material sheet is molten by solidifying material layer melting means to form a solidifying material layer in a non-solidified state.

As already described, if a slurry-like ceramic is used as a releaser, and metal flame-sprayed from a metal flame-spraying device is used as a solidifying material, metal in a non-solidified state is flame-sprayed on a solidifying layer having a releaser printed thereon or on a solidifying layer by the metal flame-spraying device to form a new solidified-state solidifying material layer.

Further, as already described, if a material in which a solidifying material is applied to a paper as a fibrous sheet is used as a solidifying sheet, this is allowed to pass through a heat roller or the like in advance, whereby a material in which a solidifying material is molten on a coated paper is placed on a solidifying layer having a releaser printed thereon, and this is solidified to form a new hardening layer.

The solidifying material layer solidifying means is provided to coagulate a solidifying material layer in a non-solidified state to form a new hardening layer including a releaser, whereby a single hardening layer is formed, and such hardening layers are stacked to thereby obtain a laminate having a desired shape.

BEST MODEL FOR CARRYING OUT THE INVENTION

Detailed embodiments of the present invention will be described hereinafter with reference to the drawings.

Figure 1:
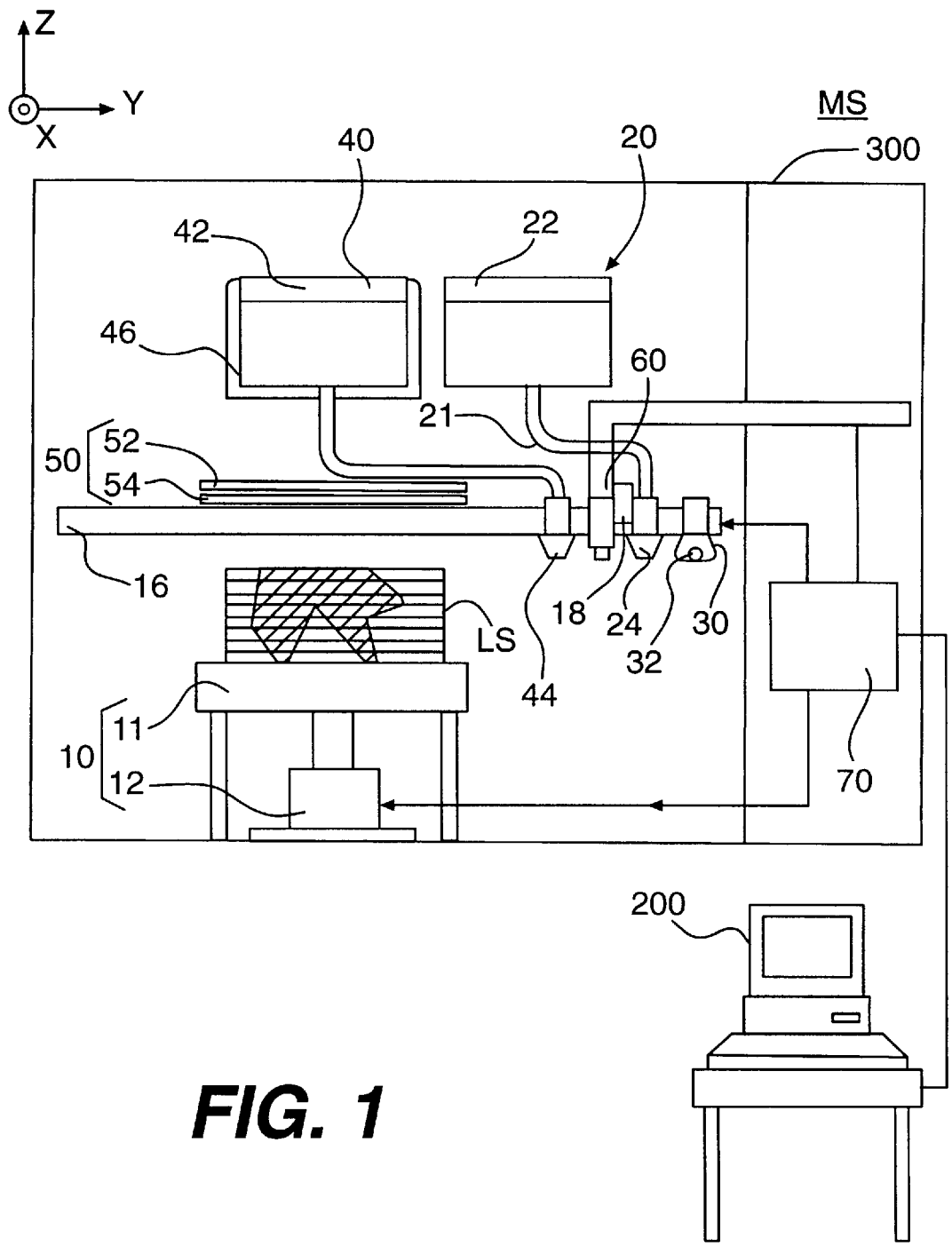
FIG. 1 is an explanatory view showing the entire structure of a third-dimensional model molding system according to the present invention.

First, the entire structure of a three-dimensional molding system in the present embodiment will be described with reference to FIG. 1. FIG. 1 is an explanatory view showing the entire structure of a three-dimensional model molding system MS.

The three-dimensional model molding system MS is composed of a graphic work station 200 and a molding apparatus 300, where the graphic work station 200 prepares section vector data representative of a sectional shape of a three-dimensional model on the basis of shape data of the three-dimensional model, to supply the prepared section vector data to the molding apparatus 300. The method for preparing section vector data representative of a sectional shape of a three-dimensional model from CAD (Computer Augmented Design) data is known in the field of CAD, which is described in detail in Japanese Patent Laid-Open No. Sho 63-72526 and Japanese Patent Laid-Open No. Hei 2-78531, description of which is therefore omitted.

The molding apparatus 300 is composed of a laminate placing unit 10 for placing a laminate structure LS to arrange it at a predetermined position, a slot cutting machine 60, a releaser printing device 20 for printing a releaser, a releaser hardening device 30 for hardening a printed releaser, a solidifying material coating device 40 for coating a solidifying material on the surface of a laminate structure LS, a solidifying material layer solidifying device 50 for solidifying the coated solidifying material, and a control device 70 for controlling the aforementioned constituent devices.

The laminate placing unit 10 is provided with a table 11 for placing a laminate structure LS being shaped, a motor 12 for moving the table 11 in a vertical direction in order to press the laminate structure LS against the solidifying material layer solidifying device 50 or in order to lower a position of the surface of the laminate structure LS by a height laminated every time a new hardening layer is laminated on the laminate structure LS, and a table position detector (not shown) for detecting a vertical absolute position of the table 11.

The solidifying material coating device 40 is the apparatus for coating a solidifying material on the surface (the uppermost surface) of a new hardening layer laminated on the laminate structure LS. This apparatus is composed of a melt tank 42 in which a solid solidifying material is molten by a heater 46, and the liquid solidifying material is stored, and a coating head 44 having an elongated coating port which extends over the width in a direction of X (a direction vertical to paper surface) of the laminate structure LS in order to coat the solidifying material on the uppermost surface of the laminate structure LS, being engaged with a Y rail 16 extending in a direction of Y and being driven by a motor, not shown, whereby the coating head is moved in a direction of Y.

The solidifying material layer solidifying device 50 is the apparatus for cooling the solidifying material applied to the uppermost surface of the laminate structure LS to completely harden it and holding the solidifying layer at a constant temperature. This apparatus is composed of a temperature regulating plate 52 which is controlled in temperature by a temperature detector, not shown, and a temperature controller, and a release film 54 fixedly mounted to two sides of the temperature regulating plate 52 so that a central portion thereof is suspended.

The releaser printing device 20 is composed of a tank 22 for storing the releaser, and a printing head 24 which is engaged with an X rail 18 extending in a direction of X and driven by the first motor, not shown, and moved in a direction of X to print the releaser on a predetermined region of the solidifying layer and a slot groove. The printing head 24 used herein is an ink jet type printing head, whose construction and function are known, description of which is therefore omitted.

Further, the X-rail 18 is engaged with the Y-rail 16 extending in a direction of X, which is driven by the second motor, not shown, and moved in a direction of Y.

The releaser hardening device 30 is the apparatus for drying and hardening the releaser printed on the predetermined region of the solidifying layer and the slot groove, the apparatus begin composed of a hot air blowing port 32 which is engaged with the Y-rail 26 extending in a direction of Y and driven by a motor, not shown, and moved in a direction of Y. Dry hot air is blown out of the hot air blowing port 32 toward the releaser, whereby the releaser is dried and hardened.

The control device 70 is the apparatus for controlling the devices such as the slot cutting machine 60, the releaser printing device 20 and the like constituting the molding apparatus 300 on the basis of the section vector data of the three-dimensional model supplied from the graphic work station 200, to obtain a three-dimensional model having a desired shape. The section vector data representative of a section of a desired three-dimensional model according to a present laminated position of the laminate structure LS are sequentially supplied to the control device 70.

Figure 2:
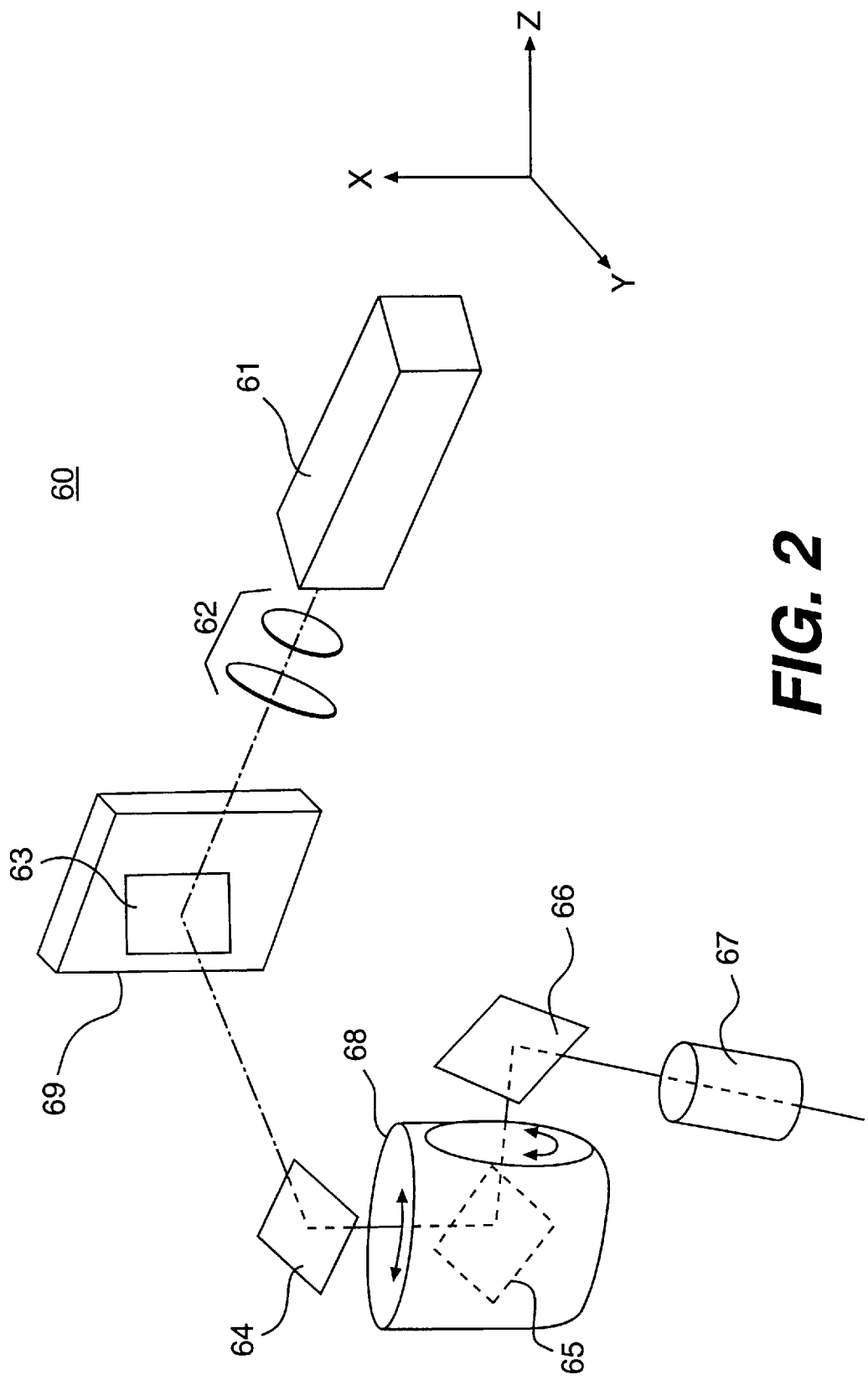
FIG. 2 is an explanatory view schematically showing the structure of a slot cutting machine.

The slot cutting machine 60 will now be described with reference to FIG. 2. FIG. 2 is an explanatory view schematically showing the structure of the slot cutting machine 60.

The slot cutting machine 60 is composed of a carbon dioxide gas laser 61 which is controlled by a pulse width controller, not shown, and whose pulse width is adjusted so that energy per unit step of a light spot in the surface of the solidifying layer SL becomes equal, a beam expander 62 for enlarging a beam diameter of a laser beam, a group of reflecting mirrors 63, 64 and 65, 66 for changing the course of the laser beam, a focusing portion 67 for determining a focal point of the laser beam, an oscillating portion 68 for varying an irradiation angle of the laser beam, and a movable bed 69. On the movable bed 69 which is driven by a first motor, not shown, to move in a direction of Y are installed the aforementioned group of reflecting mirrors 63, 64 and 65, 66, the focusing portion 67 and the oscillating portion 68. Further, the group of reflecting mirrors 63, 64 and 65, 66, the focusing portion 67 and the oscillating portion 68 are moved in a direction of X by a second motor, not shown.

Next, the laminate molding method for molding the laminate structure LS will be described using the aforementioned devices with reference to FIG. 3 while explaining the function of various devices. FIGS. 3(a) to 3(e) are sectional views of the steps schematically showing processes in the respective steps of a laminate molding method. In the following description, it is assumed that a plurality of hardening layers HL have been already laminated.

The laminate molding method comprises the slot forming step for forming a slot groove SG in a solidifying layer SL and dividing the solidifying layer SL into a necessary region SL1 constituting a three-dimensional model and an unnecessary region SL2 not constituting a three-dimensional model, the releaser coating step for coating a releaser R on a predetermined region SL3 of the solidifying layer SL, the solidifying material coating step for coating the solidifying material on the uppermost surface of a laminate structure LS, and the solidifying material solidifying step for solidifying and hardening the coated solidifying material to form the solidifying layer SL.

Figure 3A:
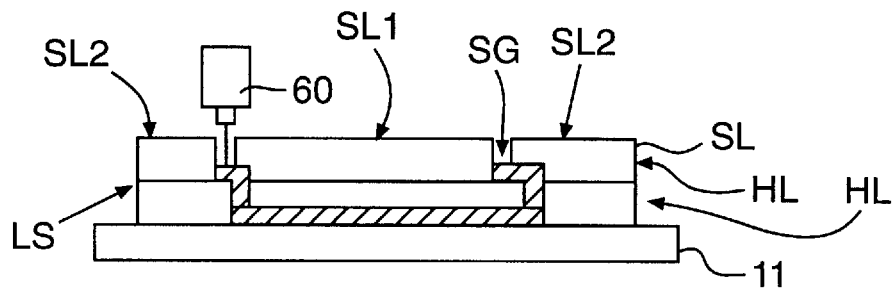
FIGS. 3(a) to 3(e) are sectional views of the steps schematically showing processes in the respective steps of a laminate molding method in a first embodiment.

First, shape data of a desirably shaped three-dimensional model are inputted into the graphic station 200 to prepare section vector data. This prepared section vector data are transmitted to the molding apparatus 300, and the slot forming step is first executed on the basis of the section vector data transmitted. This slot forming step is carried out as shown in FIG. 3(a), and the slot cutting machine 60 provided with a carbon dioxide gas laser is used.

The carbon dioxide gas laser type slot cutting machine is engaged with the Y-rail 16 on the basis of the section vector data transmitted from the graphic work station 200, the movable bed 69 provided with the group of reflecting mirrors 63, 64 and 65, 66, a focusing portion 67, and the oscillating portion 68 is driven and moved in a direction of Y by the first motor, not shown, and parts of the group of reflecting mirrors 63, 64 and 65, 66, the focusing portion 67, and the oscillating portion 68 are moved in a direction of Z by the second motor, not shown, whereby a sectional contour of a three-dimensional model is formed on the surface of the solidifying layer SL by the slot groove SG.

This slot groove SG is formed by vaporizing (sublimating) and varnishing the solidifying material which is present at a location, where a laser beam outputted from the carbon dioxide gas laser 61 is irradiated. The laser beam outputted from the carbon dioxide gas laser 61 is enlarged in beam diameter by the beam expander 62 and changed in course by the group of reflecting mirrors 63, 64 and 65, 66 and formed in focal point by the focusing portion 67. Further, the slot cutting machine 60 used herein is provided with the oscillating portion 68 so that an irradiation angle of the laser beam can be varied within the X-Z plane to thereby form the slot groove SG having a draft angle.

The carbon dioxide gas laser 61 is adjusted in output so that the depth of the slot groove SG formed is at least more than a thickness of the solidifying layer LS. According to the prior art, in this case, it has been necessary to perform the precise laser output control in order to considerably shave off the solidifying layer SL to form a recess portion, or in order to melt and bond powders of the solidifying material. However, in the present embodiment, the slot groove SG is merely formed in the solidifying layer LS, and therefore, the precise output control need not be performed and the carbon dioxide gas laser 61 can be easily handled.

At this time, preferably, the releaser R printed on the predetermined region SL3 of the solidifying layer LS having a temperature higher than a vaporization (sublimation) temperature of the solidifying material is used to prevent the releaser R from being varnished. If the releaser R having a vaporization temperature higher than that of the solidifying material is used, the output control of the carbon dioxide gas of the carbon dioxide gas laser 61 is further facilitated.

Figure 3B:
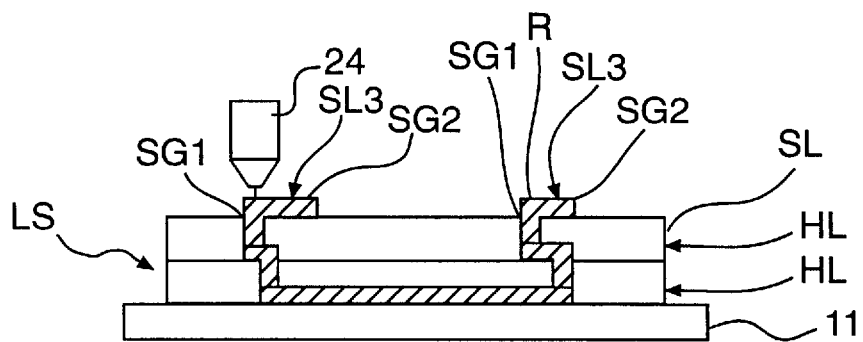

In this way, when the slot groove SG is formed in the solidifying layer SL, the solidifying layer SL is divided into the necessary region SL1 constituting a desirably shaped three-dimensional model and the unnecessary region SL1 not constituting a three-dimensional model. The predetermined region SL3 of the surface of the solidifying layer SL divided into a plurality of regions is subjected to the releaser printing step for printing the releaser R in order to prevent the slot groove SG from being blocked by the solidifying material coating step carried out next time and in order to enhance the separation characteristics of the laminate structure LS. This releaser printing step is carried out by the releaser printing device 20 as shown in FIG. 3(b).

In the present embodiment, as the releaser printing device 20, an ink jet type printer is used. The releaser R stored in the releaser tank 22 is supplied to the ink jet type printing head through the supply pipe 21. The printing head 24 is driven by the first motor, not shown, and guided to the X-rail 18, and then moved in the direction of X, to effect the printing in the range from the slot groove SG1 formed this time to the slot groove SG2 formed next time.

In this manner, when the printing head 24 is moved in the direction of X, it is then driven by the second motor, not shown, guided by the Y-rail 16, moved in the direction of Y and again moved in the direction of X. This cycle of operation is repeated to complete the printing of the releaser R onto a necessary spot of the solidifying layer SL. It is to be noted that if coating (printing) takes place so as to prevent the next solidifying material from entering the slot groove SG, the solidifying material need not always be filled in the slot groove SG.

In this way, the releaser R is printed by the printing device, whereby the releaser R can be coated (printed) on only the desired position to shorten the time for coating the releaser R and shorten the time for drying it. Particularly, since the ink jet type printer is used, the printing time can be considerably shortened. Further, since the releaser R is coated (printed) in very thin using the printing device, even if laminates are stacked, no thickness effect is produced.

The releaser R used herein is preferably higher in viscosity than a urea mixture in the molten state. This is because of the fact that when the next releaser S is applied to the portion on which the releaser R is printed, the releaser R is prevented from being removed. A preferable example of the releaser R is KF96 manufactured by Shin-Etsu Chemical Co., Ltd. which is silicone oil. The viscosity of the releaser R is 100,000 cs at its maximum.

Other examples of the used releaser R include a wax releaser, and various inks which are mixtures of a mineral fine power and a solvent. If various inks are used as a releaser, the adhesiveness to the solidifying layer SL increases, and a solidifying material having a high viscosity can be used. Further, a photo-hardening resin can be also used. For example, Benefix PC made of Ader, which is a photo-hardening adhesive, may be used. Use of the photo-hardening resin leads to the merit that the hardening time is short and the solvent is not vaporized. In a second embodiment described later, the case will be described in which a photo-hardening resin is used as a releaser R.

Figure 3C:
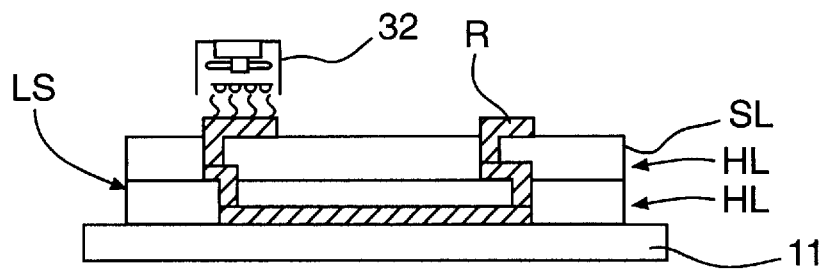

The releaser R thus printed on the predetermined region SL3 is dried and hardened by the releaser hardening device 30 as shown in FIG. 3(c). The releaser hardening device 30 is driven by the motor, not shown, and blows out dry and hot air from the hot air blowing port 32 while moving in the direction of Y to dry and harden the releaser R printed on the predetermined region SL3.

Figure 3D:
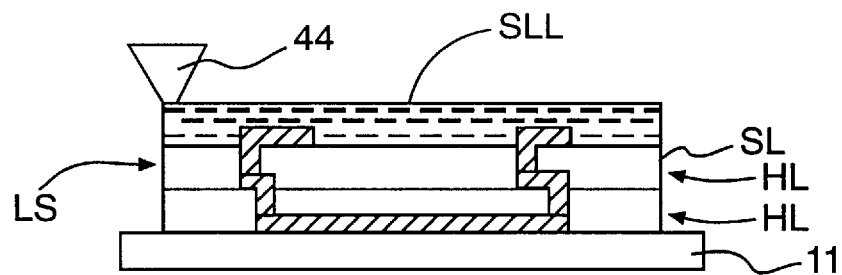
Figure 3E:
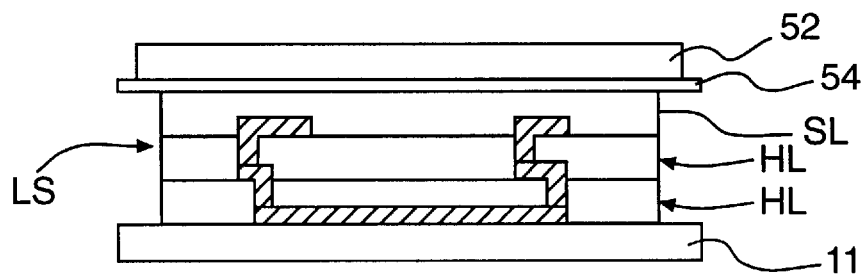
Figure 4A:
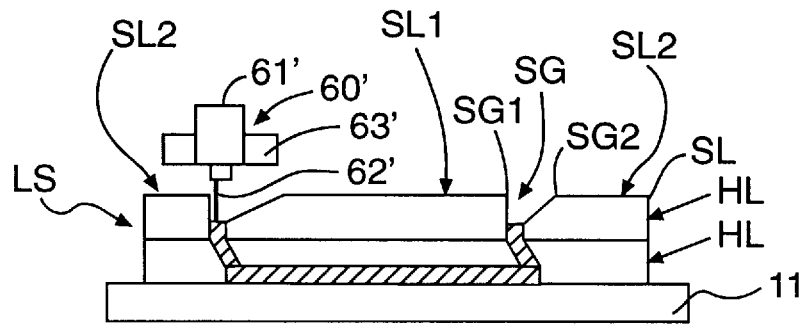
FIGS. 4(a) to 4(e) are sectional views of the steps schematically showing processes in the respective steps of a laminate molding method in a second embodiment.
Figure 4B:
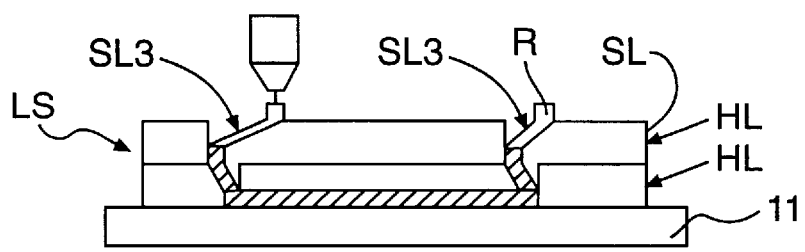
Figure 4C:
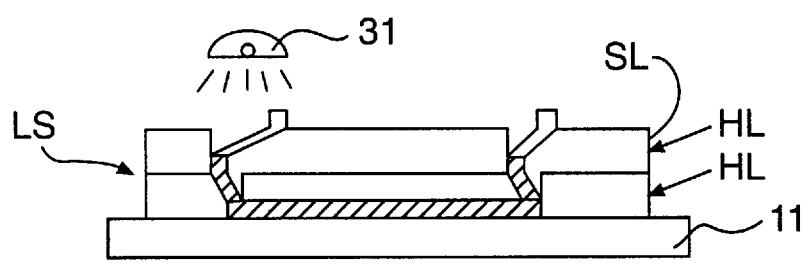
Figure 4D:
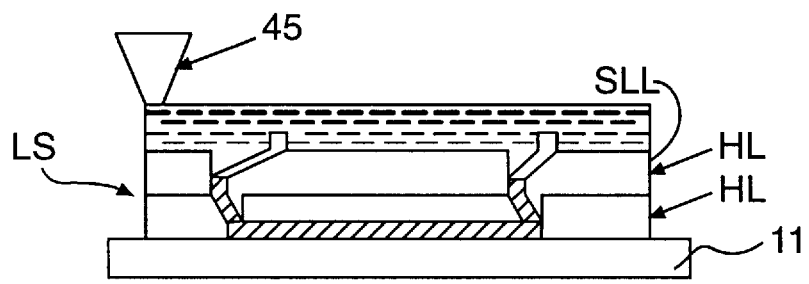
Figure 4E:
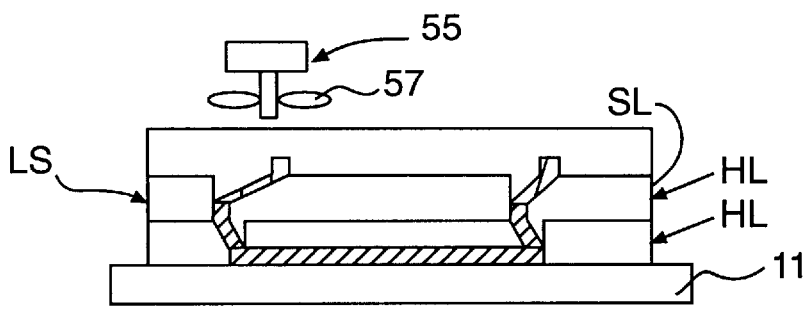

When the releaser R is printed and dried, the solidifying material coating step is carried out using the solidifying material coating device 40, as shown in FIG. 3(d). When the solidifying material S is charged into the melting tank 42, the solidifying material S becomes melted by a heater 40 encircling the melting tank 42. The melted solidifying material S is supplied to the coating head 44 through the supply pipe 43 and applied to the surface (the uppermost surface) of a new hardening layer HL laminated on the laminate through a coating port extending in an elongated manner over the width in the direction of X of the laminate structure LS.

Since the solidifying material coating device 40 provided with the coating head 44 is driven by the motor, not shown, and thereby moved in the direction of Y along the Y-rail 16, when the solidifying material S is continuously supplied, whereby the solidifying material S is evenly coated over the Y direction of the laminate structure LS to form a solidifying layer SLL. The thickness of the solidifying layer SLL formed at that time is preferably about 25 µm to about 250 µm.

In the solidifying material S used herein, a urea mixture described in Japanese Patent Laid-Open No. Hei 2-55638 is used, which is a urea mixture added with polyvinyl alcohol and a co-compound. The co-compound is a compound which is co-bonded with urea at a low temperature to greatly lower a melting point or a solidifying point of a co-material, examples of which are benzoic acid, benzene sulfonic acid, benzene sulfonic acid, benzoyl chloride, glycine, naphthalene, glutaric acid, etc. The urea mixture has a melting point of approximately 120° C., which is higher than a room temperature, so that the mixture is heated by the heater 46 provided around the melting tank 42 to maintain it in a melting state. It is to be noted that the producing method and properties of the urea mixture are described in detail in Japanese Patent Laid-Open No. Hei 2-55638, description of which is therefore omitted.

Other solidifying materials S that may be used include thermoplastic engineering plastics heated and melted (polycarbonate, an ABS resin, polyethylene, etc.), and waxes heated and melted (paraffin, polyethylene glycol, etc.). If the engineering plastics are used, a three-dimensional model formed of the engineering plastics can be obtained by removing the releaser R and can be used without modification, and in addition, a model can be shaped by selecting plastics according to the use of a final model. Further, if a mixture in which polyvinyl alcohol and a co-compound are added to urea or wax are used, a model for precise casting can be provided.

In this way, when a new solidifying material layer SLL is formed, the solidifying material solidifying step for solidifying the solidifying material layer SLL using the solidifying material layer solidifying device 50 mentioned previously is carried out, as shown in FIG. 3(e).

Since the solidifying layer solidifying device 50 is fixed, the table 11 for the laminate placing unit 10 is driven by the motor 12 and moved upward in order that the solidifying material layer SLL applied to the surface of the laminate structure LS placed on the table 11 of the laminate placing unit 10 is pressed against the temperature regulating plate 52 of the solidifying material layer solidifying device 50. At this time, the moving amount of the table 11 is detected by the table position detector for detecting the vertical absolute position of the table 11, not shown, so that the solidifying layer SLL is formed into the solidifying layer SL having a predetermined thickness, and the detected data is used for the selection of the section vector data to be transmitted next.

The solidifying material layer SLL is pressed against the temperature regulating plate 52 through the release film 54 fixedly mounted on the side of the temperature regulating plate 52. The temperature regulating plate 52 is adjusted in temperature to a constant value by a temperature detector and the temperature regulating plate 52 is adjusted in temperature to a constant value by a temperature detector and a temperature regulating portion, not shown, and is a smooth flat plate. Therefore, the pressed solidifying layer SLL is quickly solidified to form a solidifying layer SL having a predetermined thickness provided with a smooth surface. The solidifying material layer SLL is naturally cooled before being pressed against the temperature regulating plate 52 and is in a solidified and hardened state to some extent. However, the solidifying material layer SLL is pressed against the temperature regulating plate 52, whereby the cooling is accelerated so that the surface thereof is smoothed to render the progress of the succeeding step smooth.

When the increase in temperature of the temperature regulating plate 52 is not detected any longer by the temperature detector, the table 11 of the laminate placing unit 10 is driven by the motor 12 and moved downward, whereby the solidifying layer SL is separated from the temperature regulating plate 52. At this time, since the release film 54 has its central portion fixedly mounted so that it is somewhat suspended, the release film 54 is gradually peeled from the side end of the solidifying layer SL, whereby the release film 54 can be easily separated without damaging the solidifying layer SL. From the foregoing, the hardening layer HL is formed, and after the solidifying layer SL has been separated from the release film 54, the table 11 of the laminate placing unit 10 stops at a position lowered downward by a thickness portion of the solidifying layer SL formed to wait for the slot forming step to be performed next.

The above-described various devices are each controlled by the control device 70 to obtain a three-dimensional model as desired. The section vector data are sequentially transmitted from the graphic work station 200 to the control device 70, and control commands are transmitted to various devices constituting the molding apparatus 300 on the basis of the data.

The forming step, the releaser coating step, the solidifying material coating step, and the solidifying material solidifying step shown in FIG. 3(*a*) to FIG. 3(*e*) are repeated, whereby the hardening layers HL are sequentially laminated to complete a laminate structure LS having a desired shape. The completed laminate structure LS is physically divided along the releaser R printed at a suitable location to thereby obtain the solidifying material S having a desired shape covered with the releaser R. The releaser R for covering the solidifying material S is weak in bonding force so that it can be easily removed from the solidifying material S. Further, if the releaser R is washed with a diluent, the bonding force of the releaser R can be further weakened, and the laminate structure LS having a desired shape can be more easily obtained.

In the following, the laminate molding method using the three-dimensional model molding system MS in the second embodiment will be described with reference to FIGS. 4(*a*) to 4(*e*), which are sectional views showing the steps of the laminate molding method using the three-dimensional model molding system MS in the second embodiment. First, the slot forming step shown in FIG. 4(*a*) is executed on the basis of the section vector data transmitted. In the present embodiment, a rotary cutter is used as a slot cutting machine 60', which is provided with a cutting tooth 62' rotatably driven by a motor 61' and a dust cleaner 63' for attracting dust cut off by the cutting tooth 62'. This rotary cutter is driven by a motor, not shown, and moved in directions of X and Y on the basis of the command from the control device 70, and a sectional contour of a three-dimensional model is formed by a slot groove SG.

First, the cutter is guided by the X-rail 18 to a forming position of a slot groove SG1 formed this time and moved to cut and form the slot groove SG in a vertical direction by the cutting tooth 62', and after this, the cutting tooth 62' is rotated to the forming position of a slot groove SG2 formed next time to cut the latter, and the cutter is moved in the direction of X while moving upward. By doing this, a draft angle is formed so that the separation characteristic when the laminate is separated can be enhanced. The cut dust generated at that time is attracted and removed by the dust cleaner 63'. Further, since it is a mechanical cutter, even in the case where inflammable materials are used for the solidifying material S and the releaser R, an ignition preventing device is not necessary, and there is a merit that the range of selection for materials is enlarged.

Subsequently, the releaser printing step for printing the releaser R on the slot groove SG formed is carried out as shown in FIG. 4(*b*). This step is carried out using the ink jet type printer used in the first embodiment. A photo-hardening resin is used as the releaser R. If the photo-hardening resin is used, there are merits that the hardening time is short and no vaporization of a solvent is present. However, the operation is similar to that of the first embodiment except that the photo-hardening resin which is the releaser R is printed along the draft angle, description of which is therefore omitted.

When the releaser R is printed on all the predetermined region SL3, the releaser R is hardened by the release hardening device 30 as shown in FIG. 4(*c*). Since the used releaser R is a photo-hardening resin, a lamp 31 for irradiating light having a specific wavelength is used in the releaser hardening device 30. In the case where the ultraviolet hardening resin is used as the photo-hardening resin, there can be used various ultraviolet generating light sources such as a so-called quartz low-voltage mercury lamp, a heavy hydrogen lamp, a bactericidal lamp, a photopolymerization lamp, and a black light lamp. These light sources are cheaper than a ultraviolet laser, and a light source for generating light having a desired wavelength for hardening a photo-hardening resin can be selected. Further, in the case where a visible photo-hardening resin is used, since the resin is hardened by irradiating a visible light for several tens sec., a blue fluorescent lamp, a metal halide lamp, etc. can be used as a light source. Since these light sources can obtain larger energy as compared with a laser, it is possible to completely harden the photo-hardening resin in a shorter period of time.

When the releaser R is hardened, the solidifying material coating step shown in FIG. 4(*d*) is carried out. In the present embodiment, a spray applicator is used for the solidifying material coating device 40. The operation of the solidifying material coating device 40 is similar to that of the coating device in the first embodiment, description of which is therefore omitted. In the coating device used in the first embodiment, since the coating head 44 is in contact with the hardening layer HL of the laminate structure LS previously formed, when the coating head 44 is moved, the hardening layer HL is sometimes dragged. However, in this spray applicator, the solidifying material S is formed into mist from a spray nozzle 45 and the solidifying material is sprinkled on the uppermost surface, whereby the solidifying material S can be coated (sprinkled) without dragging the hardening layer HL of the laminate previously formed. Further, it is possible to form a uniform solidifying material layer SL over the whole region of the uppermost surface.

Accordingly, as shown in FIG. 4(*e*), in the solidifying material solidifying step, a cooling fan 55 for merely cooling the solidifying material S can be used as the solidifying material layer solidifying device 50. This cooling fan 55 is guided along the Y-rail 16 by a motor, not shown, while rotating a fan 57 whose rotary speed is controlled according to a temperature of the solidifying material layer SLL to cool and coagulate the solidifying material layer SLL. The cooling fan 55 is very simple in construction, and so, the installation cost can be suppressed.

In the case of this embodiment, slurry-like ceramics may be used as a releaser, and metal flame-sprayed from the metal flame-sprayer may be used as a solidifying material. The thickness of a metal layer may be 30 μm to 0.2 mm. The thickness of a releaser layer of slurry-like ceramics may be 20 μm to 0.1 mm or so. If so, when spraying, metal can be solidified mechanically at a low temperature, and an internal stress resulting from contraction when solidified less occurs to reduce generation of strain. Metal grains are sprayed by the metal flame-sprayer to form a solidifying layer, after which a solid shape of the surface is measured by a three-dimensional measuring unit, not shown, and sent to the graphic work station 200 for use with the adaption control for determining a section for producing section vector data to be transmitted after next time. If so, there leads to the merit that the precision of the model shape as desired is good even if the precision of the thickness of the solidifying layer to be produced by the spray is poor.

In the following, the laminate molding method using the three-dimensional model molding system MS in a third embodiment will be described with reference to FIGS. 5(a) to 5(d), which are sectional views showing the steps of the laminate molding method using the three-dimensional model molding system MS in the second embodiment. Since the three-dimensional model molding system MS in the present embodiment uses a sheetlike solid solidifying material S cut into a predetermined size in advance, this is provided with a sheet carrying device 80, a release sheet holding device 90, a sheet compression and melting device 100, and a solidifying material layer cooling device 110 in place of the provision of the solidifying material coating device 40, the solidifying material layer solidifying device 50, and the releaser hardening device 30. For the releaser printing device 20, an electrostatic transfer type printer is used.

The releaser printing device 20 is provided at an inlet of the three-dimensional model molding system MS, and the electrostatic transfer type printer is used. The electrostatic transfer type printer is provided with an electrostatic drum 23 and a transfer sheet 25. The electrostatic drum 23 is charged in adjustment with an output data pattern, to which adheres to a toner, and after this, the toner is transferred to the transfer sheet 25 to print it on a printing object. In the present embodiment, there is provided a construction in which in replace of a toner, a releaser R adheres to the electrostatic drum 23. Since the detailed construction and function of the electrostatic transfer type printer is known, description thereof is omitted.

The sheet carrying device 80 is the device in which a solidifying sheet SS positioned at the uppermost layer of the solidifying material sheets SS laminated is carried to the uppermost surface of a hardening layer HL having the releaser R printed thereon. This device is provided with a carrying mechanism 81 for holding the solidifying material sheet SS to carry it to a predetermined position.

The sheet compression and melting device 100 is the device in which the solidifying material sheet SS placed on the uppermost surface of the hardening layer HL by the sheet carrying device 80 is molten to form a solidifying material layer SLL covering the releaser R to integrate it with the uppermost surface. This device is constituted of a heating plate 101 housing a heater therein, which is fixedly installed.

The release sheet holding device 90 is the device for holding and moving a release sheet 91 between a sheet compression and melting device 100, described later, and a solidifying material layer cooling device 110. This device holds the release sheet 91 for preventing the solidifying material sheet SS from adhering to the heating plate 101 of the sheet compression and melting device 100 even if the solidifying material sheet SS is molten by being positioned on the upper surface of the solidifying material sheet SS.

The solidifying material layer cooling device 110 is the device for cooling the solidifying material layer SLL to form the hardening layer HL. This device is composed of a temperature sensor, not shown, a temperature controller, and a cooling plate 111 housing a refrigerant pipe therein, which are fixedly installed.

The steps of the laminate molding method will be described hereinafter while explaining the function of these devices.

Figure 5A:
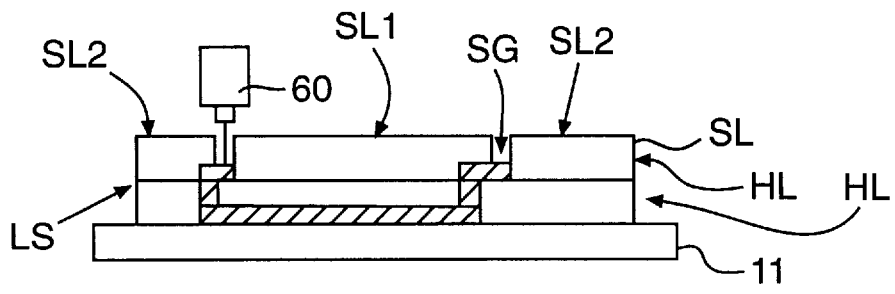
FIGS. 5(a) to 5(d) are sectional views of the steps schematically showing processes in the respective steps of a laminate molding method in a third embodiment.

First, the slot forming step starts for forming the slot groove SG on the hardening layer HL previously formed on the basis of the section vector data, as shown in FIG. 5(a). This step is the same as the slot forming step in the first embodiment, description of which is therefore omitted.

Figure 5B:
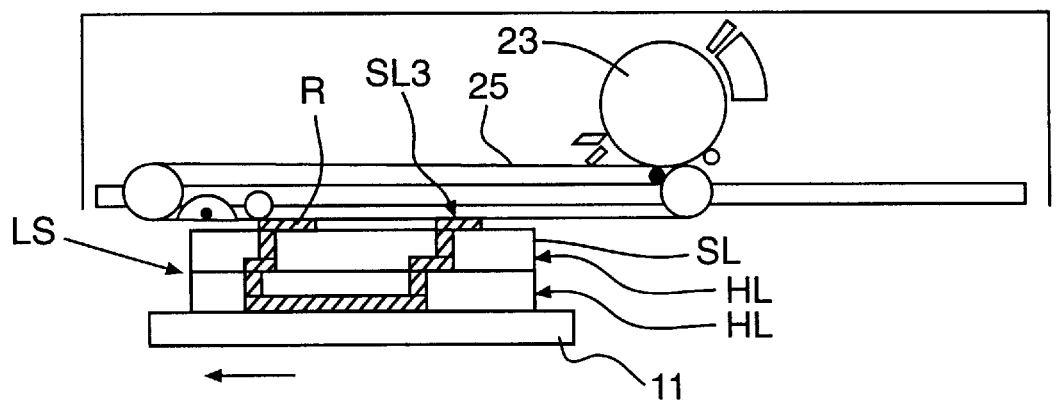

Subsequently, the predetermined region SL3 of the solidifying layer formed in the slot forming step is subjected to the releaser printing step for printing the releaser R as shown in FIG. 5(b). The electrostatic drum 23 is charged on the basis of command from the controller 70 so that a printing pattern is formed from the slot groove SG1 previously formed to the slot groove SG2 formed next time, and the releaser R adheres thereto. The releaser R formed on the printing pattern is transferred to the transfer sheet 25, and the releaser R appears on the printing surface by movement of the transfer sheet 25. The table 11 of the laminate placing unit operatively connected to the transfer sheet 25 is moved in the direction of Y to thereby print the releaser R on the uppermost surface.

The releaser used herein comprises a toner for the electrostatic transfer type printer which has a melting point of 140° C. and comprises a resin powder whose main component is polyester. If various colors of the toner are used, colored releaser printing can be easily carried out. In addition thereto, on the grain surface having a high heat resistance such as graphite fluoride, ceramic, silicone, etc. can be used powder applied with coating for adjusting the charging property of polyester or the like.

Figure 5C:
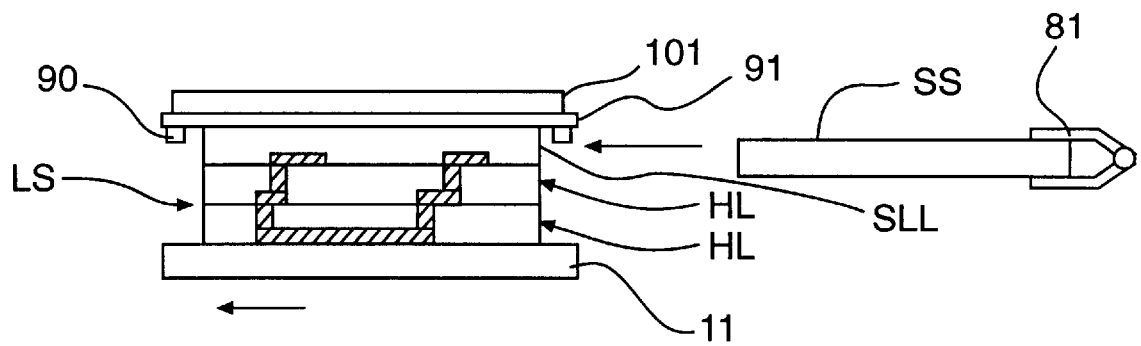

Even after the releaser R has been printed, the table 11 of the laminate placing unit moves and stops at a position at which the sheet compression and melting device 100 is fixedly mounted to execute the solidifying material layer forming step as shown in FIG. 5(c). When the table 11 of the laminate placing unit stops, the solidifying material sheet SS is carried to the hardening layer HL having the releaser R printed thereon by the sheet carrying device 80, and the release sheet 91 is positioned on the solidifying material sheet SS by the release sheet holding device 90. When the solidifying material sheet SS is carried by the sheet carrying device 80 and the release sheet 91 assumes a predetermined position by way of the release sheet holding device 90, the table 11 of the laminate placing unit moves upward where the solidifying material sheet SS is pressed against the heating plate 101 heated by the internal heater. Then, the solidifying material sheet SS begins to melt to form the solidifying material layer SLL in a molten state so as to embrace the printed releaser R.

The solidifying material sheet SS used herein is preferably one made of a material having a melting point lower than that of the releaser R, such as a polyethylene sheet having a melting point of approximately 110° C., and having a large wet-angle with respect to the releaser R.

Figure 5D:
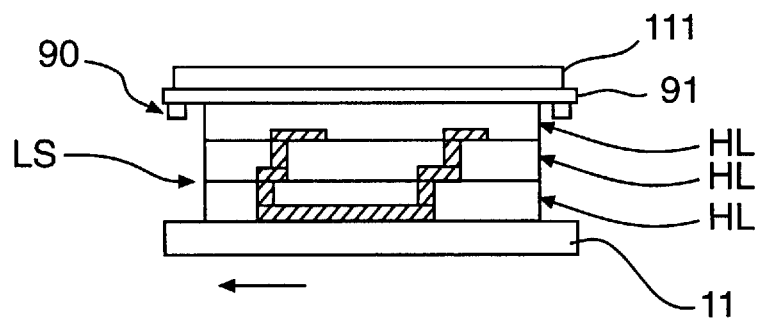

After a lapse of a predetermined time, the table 11 of the laminate placing unit moves downward, moves in the direction of X and stops at a position where the solidifying material layer cooling device 110 is fixedly mounted to execute the hardening layer forming step as shown in FIG. 5(d). At this time, the release sheet holding device 90 operatively connected to the table 11 of the laminate placing unit also moves in the direction of Y. The table 11 of the laminate placing unit starts its upward movement when the former stops its movement in the direction of Y, the solidifying material layer SLL is pressed against the cooling plate 111. The cooling plate 111 is controlled in temperature by a temperature sensor, a temperature control portion and the housed refrigerant pipe so that when the temperature of the solidifying material layer SLL is high, the temperature of the cooling plate 111 is controlled to be lower, and as the solidifying material layer SLL is cooled, the temperature of the cooling plate 111 is controlled to a predetermined value, thereby forming the hardening layer HL at a predetermined temperature.

When the hardening layer is thus formed, the table 11 of the laminate placing unit again starts its downward movement. At this time, since the release sheet 91 is placed and held on the solidifying material layer SLL, the smooth hardening layer HL can be obtained without damaging the hardening layer HL.

In the case of this embodiment, as the solidifying material sheet SS, there may be used one in which a solidifying material is applied to paper, which is a fibrous sheet. The thickness of paper is 50 $\mu$m to 0.2 mm, and the thickness of the solidifying material is about 20 to 50 $\mu$m. Although paper coated with the solidifying material is not shown, it may be passed through a heat roller or the like in advance to melt the solidifying material on the coated paper, in which state the paper is carried to and placed on the hardening layer HL having the releaser R printed, after which the cooling plate 111 is pressed to coagulate the solidifying material to form a new hardening layer HL. By doing so, it is possible to save trouble that the solidifying material sheet SS is placed on the hardening layer HL having the releaser R printed thereon, after which it is heated and molten using the heating plate 101. Accordingly, this results in the advantage that the productive efficiency of the three-dimensional model is enhanced and the productivity is improved.

Further, unless the releaser R printed on the hardening layer HL is solidified, when the solidifying material sheet SS is placed thereon, the releaser R is sometimes spread laterally between the solidifying material sheet SS and the hardening layer HL. In the case where one with a solidifying material applied to the paper is used, the releaser R may permeate to the coated paper since the paper itself is fibrous, but is not spread laterally. Accordingly, in the step in which the slot groove SG is formed in the hardening layer HL, on the basis of the section vector data with the three-dimensional model being fed, to form a contour, the contour having the smallest dimension is finished. In this case, even if the releaser R printed on the hardening layer HL is not solidified, one in which a solidifying material is applied to the coated paper is heated and molten in advance and superposed (placed). Therefore, the shaping (molding) speed of the three-dimensional model can be increased to further improve the productivity.

Furthermore, there is a great economical advantage that the coated paper cheaper than the 100% solidifying material sheet SS is provided as the constituent element of the laminate shaped article whereby the shaped article can be marketed at less cost.

In the following, the laminate molding method using the three-dimensional model molding system MS in a fourth embodiment will be described with reference to FIGS. 6(a) to 6(d), which are sectional views showing the steps of the laminate molding method using the three-dimensional model molding system MS in the fourth embodiment. The laminate molding method using the three-dimensional model molding system MS in the present embodiment uses a roll sheet-like solidifying material sheet SS, while the laminate molding method using the three-dimensional model molding system MS in the third embodiment used the solidifying material sheet SS, to enhance the continuity of the steps, there being provided with a sheet supply device 80' in place of the sheet carrying device 80, and a sheet cut-out device 120 for cutting out a necessary portion of the roll sheet-like solidifying sheet SS. Further, an electrostatic transfer type printer for directly printing the releaser R on the roll sheet-like solidifying material sheet SS used is not provided with a transfer sheet.

The sheet supply device 80' is composed of a supply roll 82' for supplying the roll sheet-like solidifying material sheet SS, and a winding roll 81' for winding the roll sheet-like solidifying material sheet SS from which the necessary portion is cut out, there being controlled so that the roll sheet-like solidifying material sheet SS is moved in synchronism with the electrostatic drum 23 of the electrostatic transfer type printer.

The sheet cut-out device 120 is composed of a cutter 121 for cutting out the roll sheet-like solidifying material sheet SS placed on the laminate structure LS into a predetermined size, a motor (not shown) for moving the cutter in a vertical direction, and a guide rail 122.

The steps of the laminate molding method will be described hereinafter while explaining the function of these devices.

Figure 6A:
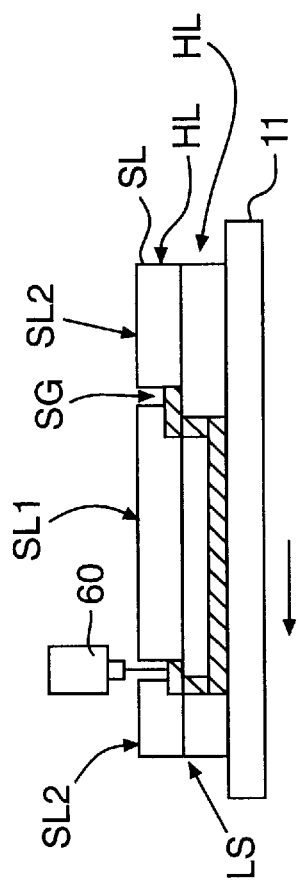
FIGS. 6(a) to 6(d) are sectional views of the steps schematically showing processes in the respective steps of a laminate molding method in a fourth embodiment.

First, the slot forming step for forming a slot groove SG starts, as shown in FIG. 6(a), for the hardening layer HL previously formed on the basis of the section vector data. This step is the same as the slot forming step in the first embodiment, description of which is therefore omitted.

Figure 6B:
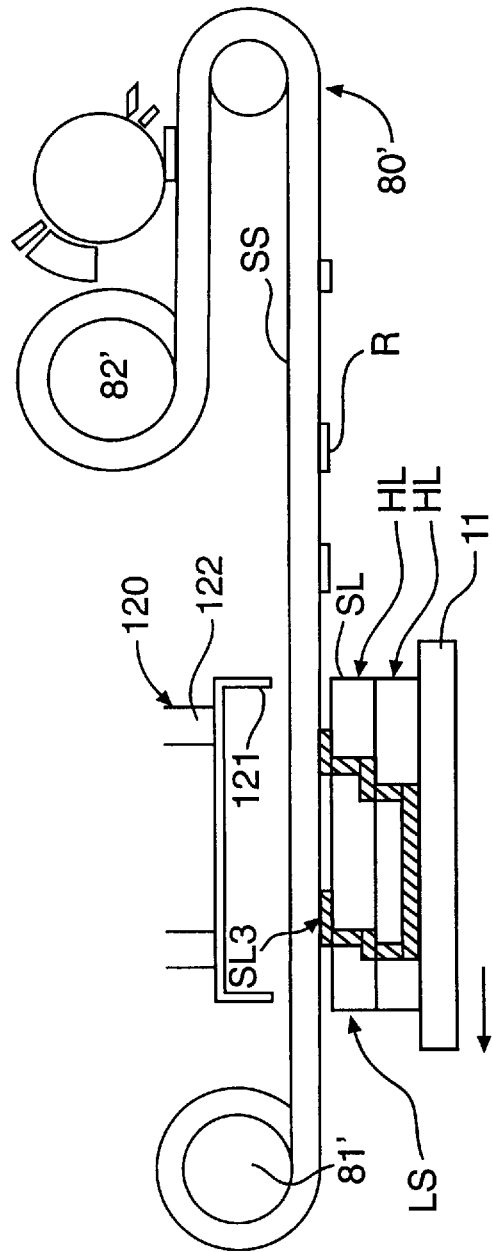

Subsequently, the formed predetermined region SL3 is subjected to the releaser printing step for printing the releaser R as shown in FIG. 6(b). The electrostatic drum 23 is charged on the basis of command from the controller 70 so that a printing pattern is formed from the slot groove SG1 previously formed to the slot groove SG2 formed next time, and the releaser R adheres thereto. The releaser R formed on the printing pattern is directly transferred to and printed on the roll sheet-like solidifying material sheet SS, and a next surface to be printed appears by movement of the roll sheet-like solidifying material sheet SS.

Figure 6C:
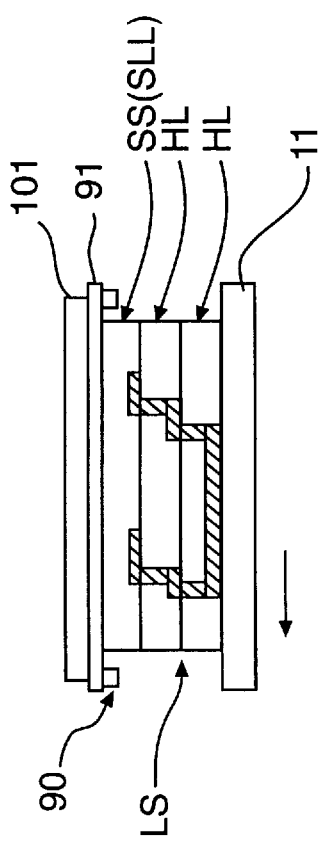

The roll sheet-like solidifying material sheet SS having the releaser R printed thereon stops its movement when the former arrives at a predetermined position, and when the table 11 of the laminate placing unit moves upward and placed on the laminate structure LS, the cutter 121 of the sheet cut-out device 120 is driven by a motor, not shown, the cutter 121 moving downward while being guided by the guide 122 to cut out the solidifying material sheet SS into a predetermined size, after which the cutter 121 moves upward. When the solidifying material sheet SS is cut out into a predetermined size as described above, the table 11 of the laminate placing unit starts its movement in the direction of Y and stops at a position where the sheet compression and melting device 100 is fixedly mounted to effect the solidifying material layer forming step as shown in FIG. 6(c).

When the table 11 of the laminate placing unit stops, the release sheet 91 is positioned on the solidifying material sheet SS cut out into a predetermined shape by the release sheet holding device 90, and when the release sheet 91 is positioned at a predetermined position, the table 11 of the laminate placing unit moves upward to press the solidifying material sheet SS against the heating plate 101 heated by the internal heater. Then, the solidifying material sheet SS begins to be molten to form the solidifying material layer SLL so as to embrace the printed releaser R.

Figure 6D:
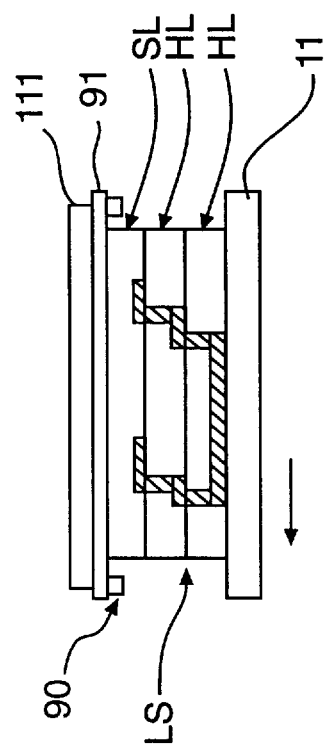

After a lapse of a predetermined time, the table 11 of the laminate placing unit moves downward, moves in the direction of X and stops at a position where the solidifying material layer cooling device is fixedly mounted to execute the hardening layer forming step as shown in FIG. 6(d). At this time, the release sheet holding device 90 operatively connected to the table 11 of the laminate placing unit also moves in the direction of Y. The table 11 of the laminate placing unit starts its upward movement when the former stops its movement in the direction of Y, the solidifying material layer SLL is pressed against the cooling plate 111. The cooling plate 111 is controlled in temperature by a temperature sensor, a temperature control portion and the housed refrigerant pipe so that when the temperature of the solidifying material layer SLL is high, the temperature of the cooling plate 111 is controlled to be lower, and as the solidifying material layer SLL is cooled, the temperature of the cooling plate 111 is controlled to a predetermined value, thereby forming the hardening layer HL at a predetermined temperature.

When the hardening layer HL is thus formed, the table 11 of the laminate placing unit again starts its downward movement. At this time, since the release sheet 91 is placed and held on the solidifying material layer SLL, the smooth hardening layer HL can be obtained without damaging the hardening layer HL.

In the case where slurry-like ceramics is used as a releaser and metal flame-sprayed from the metal flame-sprayer is used as a solidifying material, after a desired shape has been obtained, pressure of about 100 tons at approximately 1000° C. is applied for about 40 hours by a hot press, not shown, to effect a diffusion bonding. After gradual cooling, the ceramics is divided into sections into a predetermined shape, which may be taken out. By doing so, a metal model which is high in shear stress and high in accuracy in dimension can be fabricated. This leads to an advantage that the model can be used as a mold.

Also in this case, as the solidifying material sheet SS, one in which a solidifying material is applied to paper which is a fibrous sheet may be used, as previously mentioned. When one in which a solidifying material is applied to paper is delivered from the supply roll 82', it is allowed to pass through a heat roller or the like in advance to melt the solidifying material on the coated paper, in which state, it is carried onto the hardening layer HL having the releaser R printed thereon. It is then cut out into a predetermined shape on the basis of section vector data of the three-dimensional model by the sheet cut-out device 120, and the cut-out is placed on the hardening layer HL of the laminate structure LS. Thereafter, the cooling plate 111 may be pressed to coagulate the solidifying material to form a new hardening layer HL.

As described in detail in the foregoing, in the three-dimensional model molding system MS and the laminate molding method using the three-dimensional model molding system MS in the present embodiment, there is provided the releaser printing device 20 for applying (printing) the releaser R by way of printing, and therefore, the releaser R can be printed on only the region to be printed (applied).

Further, by printing (applying) the releaser R on only the desired region, it is not necessary to form a large recess in the hardening layer HL as in prior art but the linear slot groove SG may be formed, thus facilitating the output adjustment of a carbon dioxide gas laser and improving the working efficiency.

Furthermore, in the third and fourth embodiments, since the solid sheet-like agent is used as the solidifying material, there are advantages that a device for keeping the solidifying material S in a molten state is not necessary, and the solidifying material S is easily handled.

While the present invention has been described by way of the several embodiments, it is to be noted that the present invention is not limited to the above-described embodiments but various modifications and improvements may be made without departing from the spirit and the scope of the present invention.

For example, while in the present embodiments, the temperature regulating plate is used as the solidifying material layer solidifying device, it is sufficient that the solidifying material layer may be solidified and a predetermined thickness may be obtained. For example, if a temperature regulating roller is used, it is not necessary that the laminate placing unit need not be operated up and down to enable the simplification of the construction of the molding apparatus.

Moreover, while in the present embodiments, the carbon dioxide gas laser type slot cutting machine and the rotary cutter are used as the slot cutting machine, it is to be noted that a mechanical cutter may be used, and if the mechanical cutter is used, the depth accuracy of the slot groove formed can be improved and the width of the slot groove can be narrowed.

INDUSTRIAL APPLICABILITY

As will be apparent from the above explanation, in the laminate molding method and apparatus, since the printing means and printing device are used as means for applying a releaser, it is possible to apply the releaser to only the necessary portion. Further, since the releaser can be printed on only the necessary portion, it is sufficient that a narrow slot groove may be formed, and the output control of the laser irradiation light can be facilitated and the working efficiency can be improved. Furthermore, since a coating area of the releaser is small, it is possible to obtain a laminate model without a residual releaser and having a high molding accuracy.

I claim:

1. A laminate molding method of fabricating a desired shape consisting of laminate layers having a first layer in a completely solidified state, the method comprising:

providing a solidified first layer;

a first step of forming a second layer on the first layer; the first layer having a viscosity higher than the second layer;

a second step of forming a slot groove in the second layer thereby forming first and second regions, the slot groove dividing the first and second regions at least one of the regions comprising a necessary region for the desired shaped;

a third step of printing a releaser on the second layer;

a fourth step of forming a third layer on the second or on the first layer, the second layer having a viscosity higher than the third layer;

a fifth step of solidifying the third layer; and a sixth step of repeating the first, second, third, fourth, and fifth steps using a solidified third layer as the first layer until the laminate having the desired shape is completed.

2. The laminate molding method according to claim 1, wherein the third layer is applied to a surface of the second layer having a predetermined thickness in a non-solidified state.

3. The laminate molding method according to claim 1 or 2, wherein the first layer comprises polyvinyl alcohol and a co-compound added to urea.

4. The laminate molding method according to claim 1, wherein the releaser in the third step includes a photo-hardening resin.

5. The laminate molding method according to claim 4, wherein the photo-hardening resin is hardened by an ultra-violet source or a visible light source.

6. The laminate molding method according to claim 1, wherein the first layer is formed by placing a first layer sheet on the second layer, and the first layer sheet is melted to be in a non-solidified state.

7. The laminate molding method according to claim 1, wherein the first layer is formed by cutting out a first layer sheet into a predetermined size thereby forming a cut-out first layer sheet, and the cut-out first layer sheet is melted to be in a non-solidified state.

8. The laminate molding method according to claim 1, wherein the releaser in the third step is printed on the second type layer corresponding to regions of exclusive logic sums for the first and second regions on the second layer.

9. The laminate molding method according to claim 1, wherein the second layer, in a non-solidified state, is pressed against a temperature regulating plate having a high releasing characteristic film on a surface thereof.

10. The laminate molding method according to claim 1, wherein the slot groove in the second step is formed by a laser beam.

11. The laminate molding method according to claim 1, wherein the slot groove in the second step is formed to have an inclined angle with respect to a vertical plane of the second type layer.

12. The laminate molding method according to claim 1, wherein the releaser in the third step includes a plurality of colors to form a desired color in a desired region.

13. The laminate molding method according to claim 1, wherein the first region in the second step constitutes the desired shape.

14. The laminate molding method according to claim 1, wherein the third layer solidifies with changes from a high temperature to a low temperature.

15. The laminate molding method according to claim 1, wherein the releaser in the third step includes a ceramic in a slurry state.

16. The laminate molding method according to claim 15, wherein the ceramic has a thickness of 20 to 100 $\mu$m.

17. The laminate molding method according to claim 1, wherein the fourth step includes applying a molten metal using a metal flame-sprayer to form the third layer.

18. The laminate molding method according to claim 17, wherein the molten metal has a thickness of 30 to 200 $\mu$m.

19. A laminate molding apparatus for fabricating a desired shape consisting of laminate layers having a first layer in a completely solidified state, the apparatus comprising:

a slot groove forming means for forming a slot groove in a second layer on the first layer, the first layer having a viscosity larger than the second layer;

a releaser printing means for printing a releaser on predetermined regions of the second layer or a third layer, the second layer having a viscosity larger than the third layer;

a third layer forming means for forming the third layer on the second layer on which the releaser is printed or on the first layer; and a solidifying means for solidifying the third layer.

20. The laminate molding apparatus according to claim 19, wherein a material for the third layer is applied to have a predetermined thickness on a surface of the second layer being in a non-solidified state.

21. The laminate molding apparatus according to claim 19, wherein the third layer forming means includes a spray applicator for spraying a material for the third layer which is applied in a predetermined thickness on a surface of the laminate layers on which the second layer is laminated and formed.

22. The laminate molding apparatus according to claim 19, wherein the third layer forming means comprises a first layer sheet placement means for placing the first layer sheet on the second layer, and a first layer melting means for melting the first layer sheet to thereby form the first layer into a non-solidified state.

23. The laminate molding apparatus according to claim 19, wherein the third layer forming means comprises a first layer sheet placement means for placing the first layer sheet on the second layer; a first layer sheet cut-out means for cutting out the first layer sheet into a predetermined size; and first layer melting means for melting the first layer sheet to thereby form the first layer into a non-solidified state.

24. The laminate molding apparatus according to claim 19, wherein the slot groove forming means includes a laser.

25. The laminate molding apparatus according to claim 19, wherein the slot groove forming means includes a mechanical cutter.

26. The laminate molding apparatus according to claim 19, wherein the releaser printing means includes an ink jet printer.

27. The laminate molding apparatus according to claim 19, wherein the releaser printing means includes an electrostatic transfer printer.

28. The laminate molding apparatus according to claim 19, wherein the third layer forming means includes a metal flame-sprayer.

29. The laminate molding apparatus according to claim 19, wherein the solidifying means includes a cooling fan.

30. The laminate molding apparatus according to claim 19, wherein the third layer solidifies with changes from a high temperature to a low temperature.

* * * * *